United States Patent [19]

Williams, III

[11] Patent Number: 5,025,087

[45] Date of Patent: Jun. 18, 1991

[54] 66 NYLON FILAMENT WITH LOW CONTENT OF DODECANE DIOIC ACID UNITS

[75] Inventor: Franklin P. Williams, III, Columbia, S.C.

[73] Assignee: E. I. Du Pont de Nemours and Company, Wilmington, Del.

[21] Appl. No.: 493,840

[22] Filed: Feb. 13, 1990

[51] Int. Cl.$^5$ .............................................. C08G 69/26
[52] U.S. Cl. .................................... 528/339; 528/486

[58] Field of Search ................................. 528/339, 486

[56] References Cited

U.S. PATENT DOCUMENTS 3,393,210  7/1968  Speck .................................. 528/339
4,076,664  2/1978  Pagilagan ............................ 528/339

Primary Examiner—Harold D. Anderson

[57] ABSTRACT 66 nylon filaments of improved dyeability, because of small content of dodecanedioic acid component.

1 Claim, 1 Drawing Sheet

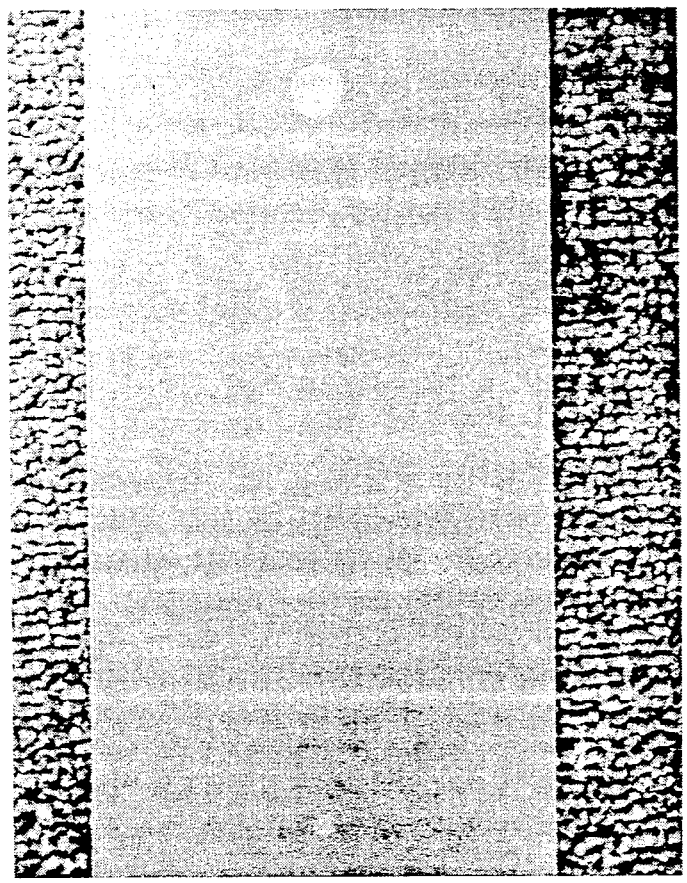

66 NYLON FILAMENT WITH LOW CONTENT OF DODECANE DIOIC ACID UNITS

FIELD OF THE INVENTION

This invention concerns improvements in 66 nylon filaments, and more particularly concerns new nylon filaments of improved dyeability, and improvements related to making the nylon filaments.

BACKGROUND OF THE INVENTION 66 nylon has a long history and has recently celebrated its 50th anniversary. Over this period many improvements have been made, and there is a continuing need to reduce costs associated with nylon and processing its fibers into garments. The ease and cost of dyeing nylon garments can be an important aspect, especially since, sometimes, improvements are possible with regard to other specific characteristics of the nylon fiber, but may be associated with a reduced affinity for acid dyestuffs; such reduced dye-affinity can decrease the commercial attraction (for certain end-uses) of another improved characteristic that could be achievable by making changes in the production process for the actual nylon fiber.

So, an improvement in dyeability has long been desirable.

Hitherto, it has been expected that the affinity of nylons for acid dyestuffs would be reduced by addition of small amounts of a dibasic acid, such as sebacic acid, as taught, e.g., by Collingwood et al in U.S. Pat. No. 3,534,540.

SUMMARY OF THE INVENTION

It has now been found, however, that modification, by introduction of a very small number of dodecanedioic units, by the addition of a very small amount of dodecandioic acid into 66 nylon, provides a significant improvement in dyeability, contrary to this teaching in the art. Other advantages are described hereinafter.

BRIEF DESCRIPTION OF DRAWINGS

The FIGURE is a photograph of samples of dyed fabric to demonstrate the improvement in dyeability achievable by the invention, as described hereinafter.

DETAILED DESCRIPTION OF THE INVENTION

The effect of small quantities of this additive on spinning performance and yarn properties was evaluated in the following manner; 3618 pounds of 66 nylon salt were charged to an autoclave as a 76% by weight aqueous solution. This was immediately followed by separate but concurrent additions of 4107 g of a 25% by weight aqueous solution of potassium iodide and 3782 g of 66 nylon salt as a 52% by weight aqueous solution containing 0.344 lbs. of dodecanedioic acid. The batch was heated until it reached 195° C., at which time 4933 g of 2.5% by weight solution of cupric acetate was added. Heating was continued until 2750 lbs. nominal of polymer with a nominal RV of 42 was collected as flake. This flake was fed to a spinning machine by a screw melter and test yarns were collected at a speed of 3747 meters/min. using a draw ratio of 3.48.

The yarns were compared with unmodified yarns made by the same process from flake prepared in the same manner, but without any addition of dodecanedioic acid. The tenacity and boil off shrinkage were slightly higher for the yarn containing dodecanedioic acid (which may be attributable to a higher yarn RV, from lower flake moisture). Retraction, modulus, elongation and denier were essentially the same for the test yarns and the comparison yarns. Spinning continuity for the polymer containing dodecanedioc acid was normal for the spinning machine on which the yarns were prepared. No process negatives were noted such as could be attributed to the addition of dodecanedioic acid.

Unexpectedly, however the test yarns of this invention were dyed more readily with acid dyes despite the fact that the number of amine ends in the modified yarns were substantially the same and the RV was higher. It was also surprising that such a small concentration of a different dibasic acid produced this effect on dyeability. X-ray diffraction analysis showed no significant differences between the modified and unmodified (comparison) yarns.

Dyeability Measurement

Two acid dyes were used: C.I. Acid Blue 45 (small dye molecule) and C.I. Acid Blue 122 (large dye molecule). Skeins were heated from room temperature in a buffered closed bath and pressure dyed at the specific conditions shown in Table 1.

The dyed skeins were placed in an optical cell and the reflectance (R) was measured. Dye on fiber (DOF) was calculated using the Kubela-Munk equation, assuming that DOF is directly proportional to K/S, the ratio of light absorption coefficient to light scattering coefficient.

$$DOF \, \alpha \, K/S$$

where $$K/S = (1-R)^2/2R$$

Dyeability of any sample is the ratio of DOF of the sample to that of the same control skein in percent:

$$\text{Dyeability } (\%) = \frac{(DOF) \text{ sample}}{(DOF) \text{ Dye Bath Control}} \times 100$$

Note that both the test and control samples (those containing no dodecanedioic acid) are compared to some arbitrary Dye Bath Control and therefore this is a relative measurement.

TABLE 1

Conditions Used in Skein Dyeing Prior to Reflectance Measurements in the Procedure to Measure Dyeability

| Dyestuff | g Dye × 10^6 g Water | g Dye g Yarn | T (°C.) | Times (min) To reach T | At T | pH |
|---|---|---|---|---|---|---|
| CIAB 45 | 24.4 | 0.018 | 115 | 4.5 | 10.5 | 5.35 |
| CIAB 122 | 17.7 | 0.013 | 95 | 8.5 | 11.5 | 6.30 |

Dye Test Results

The CIAB 122 value for the test yarns (the ones containing dodecanedioic acid) was 83% versus 80% for the control yarns (those containing no dodecandioic acid). References 1 and 2 reported that such a difference of 3% would be visible as a streak in a light shade fabric if the band of yarn contained 12 or more ends side by side.

The CIAB 45 value for the test yarns was 87% versus 75% for the control yarns (those containing no dodecanedioic acid). References 1 and 2 reported that this difference of 12% would be visible as a streak in a fabric even when dyeing dark shades and when less than 12 ends are in a band side by side.

References 1 and 2 reported a mathematical model for streak visibility thresholds which was verified by human judges. Table 2 contains the results from this model used to justify the significance of the observed dye changes:

TABLE 2

| | Minimum Δ % Dyeability Visible as Streak | |
|---|---|---|
| | With 1 end | With 12 or more ends |
| Dark Brown Fabric | 16.0 | 4.6 |
| Light Brown Fabric | 9.8 | 2.8 |

1. Makansi, M., "Perception and Control of Fabric Streaks, part 1:Theory", Textile Research Journal, Vol. 57, No. 8, August 1987, pp. 463–472.

2. Makansi, M., "Perception and Control of Fabric Streaks, Part 2:Experimental", Textile Research Journal, Vol. 57, No. 9, September 1987, pp. 495–502.

The FIGURE shows a photograph of a conventional knitted tube dyed using CIAB45 and a manual procedure from test yarn and comparison yarn, from which the noticably deeper dyed shade for the test yarn can readily be seen in the lower portion of the photograph.

The amount of modifying dodecanedioic units introduced should be very small, in the range of about 50 to about 150 ppm (parts per million) by weight of polymer. Enough should be added to achieve a significant increase in dyeability. However, an increase to excessive amounts does not seem to provide continued improvement, and may produce the effect predicted in the art referred to previously.

I claim:

1. Filament of nylon 66 polymer having a content of about 50 to about 150 parts per million dodecanedioic acid units therein, said content based on total polymer weight, whereby said filament has improved dyeability.

* * * * *